United States Patent Office 2,733,206
Patented Jan. 31, 1956

2,733,206

CHEMICAL TREATMENT OF FLOOD WATERS USED IN SECONDARY OIL RECOVERY

Jan Henry Prusick, Austin, Tex., and Vance P. Gregory, Chicago, Ill., assignors to Armour and Company, Chicago, Ill., a corporation of Illinois No Drawing. Application May 17, 1951, Serial No. 226,953

7 Claims. (Cl. 252—8.55)

Our invention relates to the chemical treatment of flood waters used in secondary oil recovery, and more particularly to the treatment of flood waters to prevent corrosion of the subterranean pipes and plugging of the reservoir rock.

Within very recent times there has been developed a method of recovering residual oil from reservoir rock formations of both the siliceous and calcareous types which can be applied to formations which have already yielded all the oil that can be withdrawn by pumping. This method is characterized by the injection of water under pressure at various points into the oil-bearing reservoir rock formations to displace portions of the residual oil therein toward a producing well. Thus far this method has been more widely applied to oil-bearing sands. The general procedure for carrying out this water injection step is to drill water injection wells, usually in a ring-like formation, at distances of the order of 150 to 200 feet from the original oil well from which ordinary production is no longer possible. Water is pumped into these injection wells under high pressure so as to be forced into and through the oil-bearing sands. As this water spreads through the sand structure, the oil is displaced in the direction of the original oil producing well. Since about 1935 systematic water flooding methods have been applied to fields all over the United States. This method has opened up tremendous reserves of oil, and its efficient operation is therefore of great commercial importance.

Two general types of water are employed for secondary oil recovery. Probably the most widely used type is fresh ground water obtained from rivers, lakes, wells, etc. In some regions of the country, however, fresh ground water is in limited supply and because of the large requirements of water in repressurizing operations brine waters from producing oil wells are used. The use of brine waters is a convenient means of complying with local laws in certain sections of the country which prohibit the dumping of these waters in surface streams, etc. In some areas, it has been found convenient to use a mixture of brine waters and fresh ground waters.

The use of either fresh waters or brine waters has been found to create a serious corrosion problem in that both types of waters contain dissolved materials which attack the metal pipes through which the water is injected into the oil sands. Most of the corrosion is produced by dissolved materials having either basic or acidic properties. For example, the waters may contain carbonate ions, bicarbonate ions, sulfate ions, or sulfide ions. In general, this corrosion becomes appreciable at alkaline pH's above 8 and at acidic pH's below 6. The brine waters cause the most difficulty because of their greater quantity of dissolved inorganic materials, but in many regions the fresh ground waters are found to have distinctive alkaline or acidic properties, and therefore tend to seriously corrode the injection pipes.

There is a further corrosion problem caused by the presence of dissolved oxygen in the water. However, when brine waters are employed this can be overcome by employing closed systems so as to prevent the brine waters from coming in contact with the air. Also, it is possible to deaerate the fresh waters before injection into the wells. Sometimes the use of oxygen-free water is inconvenient because it is desired to aerate the water to remove dissolved hydrogen sulfide and for other purposes.

A further problem which in regard to some of its causes is interrelated with the corrosion problem is that of the plugging of the sand faces during flooding operations. One of the causes of this is the deposition of corrosion products from the pipes such as iron hydroxide on the sand faces. The most serious cause of plugging, however, is the growth of bacteria in the sand pores to such an extent that the pores are clogged. These bacteria are of both aerobic and anaerobic types such as *Serratia marcescens* and *Pseudomonas fluorescence*. As a further complication, the growth of many of these bacteria involves the giving off of large quantities of hydrogen sulfide which accentuates the corrosive action of the flood waters.

A somewhat different problem is that of finding means of lessening the viscous drag on the flow of oil through the sands due to the interfacial tension between the oil and water. In the operation of flooding systems it is desired to maximize the amount of oil flowing into the production well and to minimize the amount of water. It has been found that one way to achieve this result is to reduce the interfacial tension between the oil and water.

Heretofore the chemical treatment of flood waters has left much to be desired both from the standpoint of effectiveness and economy. It has been found necessary to employ several different and relatively expensive chemical compounds in combination to even partially alleviate the problems discussed above of corrosion, plugging, and viscous drag. Moreover, it has been found necessary to employ these chemicals in concentrations which make the adequate chemical treatment of the water very expensive in relation to the results obtained. Therefore, a need has long been felt for a relatively inexpensive chemical material which will effectively overcome these difficulties when incorporated in the flooding waters in very minute concentrations, say of the order of 5 parts per million.

It is therefore an object of our invention to develop an improved method for the chemical treatment of flood waters used in secondary oil recovery wherein a chemical material in extremely small concentrations will simultaneously prevent corrosion of the pipes and inhibit the growth of bacteria in the sands so as to prevent plugging. It is also an object of our invention to provide a chemical material which will function as an excellent wetting agent in reducing the interfacial tension between the water and oil to maximize the ratio of oil to water obtained from the production well. It is a further object of our invention to provide a material capable of accomplishing the above objects which is compatable with the dissolved inorganic materials in the waters, and particularly in the brine waters, so that the material employed will not form precipitates or otherwise react, for example with carbonate and sulfate ions. Further objects and advantages will appear as the specification proceeds.

We have discovered that dicoco dimethyl ammonium chloride has unexpectedly superior properties when incorporated in minute proportions in flood waters used in secondary oil recovery methods. This material is a mixture of quaternary ammonium compounds having the following general formula:

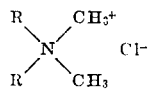

wherein R represents the alkyl groups present in the fatty acids of coconut oil.

We have found that dicoco dimethyl ammonium chloride possesses a unique combination of properties in that it is an excellent inhibitor for both acidic and alkaline corrosion, functions as a strong bactericide against the bacteria which cause plugging, and is a good wetting agent for reducing the interfacial tension between the water and oil. The discovery that this material possesses in the superlative these three extremely desirable properties for the chemical treatment of flood waters was unpredictable in that there is no known relationship between bactericidal and corrosion inhibiting properties, or between these properties and wetting agent properties. Moreover, our discovery is surprising in that quaternary ammonium compounds, such as dimyristoyl dimethyl ammonium chloride and dilauroyl dimethyl ammonium chloride, when employed alone do not give comparable results; indicating that the superlative properties of dicoco dimethyl ammonium chloride are the result of synergistic cooperation of the constituent compounds. Furthermore, we have found that dicoco dimethyl ammonium chloride is uniquely suited for use in connection with brine waters having large quantities of dissolved sulfates, carbonates, etc., since it does not react or form precipitates with such ions.

Our investigations have established that the presence of as little as 2 parts per million (p. p. m.) of dicoco dimethyl ammonium chloride in the waters injected into the oil sands is effective in controlling plugging due to the growth of bacteria and in inhibiting corrosion due to dissolved acids or bases in the waters. For most purposes, we have found that the use of the order of 5 to 10 p. p. m. of this compound in the flood waters achieves excellent results. To accomplish an initial sterilization of the pipes and surrounding sand faces concentrations up to about 100 p. p. m. can advantageously be used. For this purpose the maximum concentration is determined by the solubility of the compound which is about 100 p. p. m. at 25° C. However, for continuous injection we believe that it would be undesirable to employ concentrations greater than 50 p. p. m. and preferably about 5 to 10 p. p. m. since there is a tendency for the dicoco dimethyl ammonium chloride to be adsorbed on the siliceous material. As long as this adsorption is only in the immediate vicinity of the injection well it is harmless and possibly desirable in that it permits the rate of water injection to be slightly increased.

The preferred method of incorporating minute proportions of dicoco dimethyl ammonium chloride in flood waters is to form an aqueous dispersion of the material which is then injected into the raw water as it is being pumped into the injection pipes. To produce uniformity of the solution, it is desirable to inject the aqueous dispersion of the compound into the flood waters on the low pressure side of the pump or before the filter (if one is employed), so as to mix the compound with the water. In practice, we have found that dispersion containing about 7.5% by weight of the material are very satisfactory.

The dicoco dimethyl ammonium chloride employed in our process can be prepared from ordinary commercial grades of coconut oil fatty acids according to well-known procedures. In general, this process involves the ammoniation of the coconut oil fatty acids to the nitriles, the hydrogenation of the nitriles to the corresponding secondary amines, and finally the reaction of the secondary amines with methyl chloride to produce the mixture of quaternary ammonium compounds employed in our process. Fatty acid mixtures derived from coconut oil contain mainly lauric, myristic and other fatty acids having shorter alkyl groups in quite uniform proportions. A typical analysis of a coconut oil fatty acid mixture is as follows:

| Acid | No. of C atoms | Formula | Percent by Wt. |
| --- | --- | --- | --- |
| Caproic | 6 | $C_5H_{11}COOH$ | Trace |
| Caprylic | 8 | $C_7H_{15}COOH$ | 7.9 |
| Capric | 10 | $C_9H_{19}COOH$ | 7.2 |
| Lauric | 12 | $C_{11}H_{23}COOH$ | 48.0 |
| Myristic | 14 | $C_{13}H_{27}COOH$ | 17.5 |
| Palmitic | 16 | $C_{15}H_{31}COOH$ | 9.0 |
| Stearic | 18 | $C_{17}H_{35}COOH$ | 2.1 |
| Oleic | 18 | $C_{17}H_{33}COOH$ | 5.7 |
| Linoleic | 18 | $C_{17}H_{31}COOH$ | 2.6 |

As discussed previously there is a further corrosion problem caused by the presence of dissolved oxygen in the waters to be used for flooding operations. Although dicoco dimethyl ammonium chloride has been found to be of considerable value in inhibiting corrosion due to dissolved oxygen, it has not been found to completely prevent oxygen corrosion when relatively large amounts of dissolved oxygen are present in the water. Therefore, when a relatively large quantity of oxygen is present in the waters and it is not convenient or desirable to remove it therefrom, we have found it advantageous to incorporate in the waters a minute proportion of sodium nitrite. We have found that sodium nitrite effectively prevents corrosion from oxygen when at least 25 parts per million are incorporated in the flood waters, and preferably in amounts of the order of 50 parts per million in combination with the dicoco dimethyl ammonium chloride.

Sodium nitrite is destroyed and rendered ineffective for oxygen corrosion inhibition upon being contacted with hydrogen sulfide. Since many types of bacteria produce hydrogen sulfide during the growth processes, it can be seen that sodium nitrite alone would probably be ineffective unless other means was provided for preventing the growth of these bacteria. In our process, the dicoco dimethyl ammonium chloride is effective in killing the bacteria and thus prevents the formation of hydrogen sulfide which would destroy the effectiveness of the sodium nitrite. We have found that there is a further cooperation between dicoco dimethyl ammonium chloride and sodium nitrite in preventing corrosion in alkaline solutions. In fact, our tests indicate that the combination of these two compounds provides substantially complete protection against alkaline corrosion.

In order that the value and technique of our improved method for the chemical treatment of flood waters can be more clearly understood, we wish to set forth the following illustrative examples setting forth detailed laboratory tests as well as field tests of our invention.

EXAMPLE I

*Acid corrosion tests*

In carrying out the acid corrosion tests of which the results are reported below, a mild steel strip (3" x 1" x 0.025") was used as the testing panel in each test. The strip was first polished with #120 emery cloth, and then washed with soap and water. The metal strip was dried with a clean cloth, and allowed to stand in dry benzene until ready for use. Before using, the strip was washed with alcohol and acetone, weighed, and placed in a bottle containing 200 ml. of the test solution. The bottle was capped, shaken well, and allowed to stand undisturbed at room temperature for 24 hours. The metal strip was then removed, washed and dried in the same manner as before, and reweighed. The solution's attack upon the metal is determined by the loss in weight of the metal strip. An inhibitor in the corrosive solution will reduce this loss. To compare the effectiveness of various inhibitors, the loss in weight was computed as inches penetration per year (i. p. y.).

$$I.P.Y. = \frac{24 + 365 \times w}{(2.54) \times A \times s \times t}$$

w = wt. loss of sample in grams
A = total area of sample in square inches
s = specific gravity of steel sample (g./cc.)
t = time in hours A per cent efficiency (per cent eff.) term was developed for a clearer comparison of effectiveness:

Percent Efficiency =
$$\frac{(I.P.Y. \text{ of control} - I.P.Y. \text{ of inhibitor})}{(I.P.Y. \text{ of control})} 100$$

All tests were run in triplicate and data shown are averages of three determinations. The concentration of the dicoco dimethyl ammonium chloride is indicated in parts per million in the following table, which summarizes the results of the acid corrosion tests.

| Solution | Conc. of Inhibitor (p. p. m.) | I. P. Y. | Percent Eff. |
|---|---|---|---|
| 4% H₂SO₄ | None | .1604 | |
| Do | 10 | .0257 | 84 |
| Do | 5 | .0415 | 74 |
| 2% H₂SO₄ | None | .1056 | |
| Do | 10 | .0178 | 83 |
| Do | 5 | .0270 | 75 |
| Do | 2 | .0310 | 70 |
| 4% HCl | None | .1025 | |
| Do | 10 | .0045 | 95 |

EXAMPLE II

Basic corrosion tests

Following the procedure of Example I for the acid corrosion tests, test solutions were prepared by dissolving sufficient sodium hydroxide in water to bring the pH to 10.5. The inhibitory effect of dicoco dimethyl ammonium chloride alone and in combination with sodium nitrite is summarized in the following table:

| Solution | Inhibitor | I. P. Y. | Percent Eff. |
|---|---|---|---|
| NaOH(pH=10.5) | None | .0018 | |
| Do | 5 p. p. m. dicoco dimethyl ammonium chloride | .004 | 77.7 |
| Do | 5 p. p. m. dicoco dimethyl ammonium chloride +50 p. p. m. NaNO₂ | .000 | 100 |
| Do | 50 p. p. m. NaNO₂ | .005 | 72.5 |

The results of the above tests indicate that in alkaline waters the combination of dicoco dimethyl ammonium chloride with sodium nitrite is somewhat more effective than dicoco dimethyl ammonium chloride or sodium nitrite alone.

EXAMPLE III

Bactericidal tests

The following procedure was used in conducting the bactericidal tests:

Using Chicago tap water at 20° C. and adjusted to a pH of 6.3, washings from 24 hr. cultures of *Serratia marcescens* and *Psuedomonas fluorescens* were introduced to give an initial count on the water of 8,500,000. The inoculated water was then measured into 100 ml. quantities and poured into 8 oz., screw cap bottles. The above listed compounds were then added (at four minute intervals) to give final concentrations as indicated. The chemicals were allowed to act for 30 minutes before resampling and plating. Plating was done on both plain glucose tryptone agar and 1% Tamol N glucose tryptone agar, Tamol N being used to neutralize the effect of quaternary carry-over. The original inoculated water was again sampled at the completion of the test.

Following the above procedure, the results obtained for the inhibitory effect of dicoco dimethyl ammonium chloride are summarized in the following table:

| Conc. Inhibitor (p. p. m.) | No. Bacteria/ml. | |
|---|---|---|
| | Tamol N agar | G. T. agar |
| None | 7,500,000 | 8,000,000 |
| 2 | 2,600,000 | 2,700,000 |
| 5 | 300,000 | 340,000 |

EXAMPLE IV

Interfacial tension tests

The apparatus used in determining the effect on the interfacial tension between oil and water by dissolving therein a minute amount of dicoco dimethyl ammonium chloride was the well-known duNouy tensiometer and platinum ring. The water employed in these tests was actual field water used in flooding operations in the vicinity of Bradford, Pennsylvania, and the oil employed was Pennsylvania crude oil obtained from this same area. The following procedure was employed:

The ring was placed in a clean evaporating dish and the water or water solution was poured over it to a depth of about ¼ inch. The oil was poured over the water. This prepared dish was placed on the platform of the tensiometer and the ring was carefully attached to the arm without allowing the ring to break through the interface. The dish was raised or lowered until tension on the torque wire was due only to the weight of the ring. The reading was taken at the point where the ring pulls away from the interface and is entirely in the oil layer.

The results obtained from the tests carried out according to the above procedure are summarized in the following table:

Conc. Wetting Agent:          Interfacial Tension
  None ------------------------------------ 35
  5 p. p. m -------------------------------- 22

EXAMPLE V

Field tests

Field tests were carried out in oil fields where secondary recovery operations were in progress in the vicinity of Bradford, Pennsylvania. In carrying out these tests, dicoco dimethyl ammonium chloride was added to samples of the flood waters in concentrations of 10 p. p. m., and each sample was tested for a period of six weeks. Bacteria counts were made at the start, after three weeks, and at the end of the tests. Corrosion inhibitor test coupons were inserted at three locations in the pipes of the water-injection system, and weighed before and after the test to determine the degree of protection against corrosion afforded by treating the water with this material.

The results of the test showed dicoco dimethyl ammonium chloride to be very effective in controlling bacteria growth. The aerobic bacteria counts were made by plating out on agar and incubating for five days. They were as follows:

| | Bacteria Counts per ml. | | |
|---|---|---|---|
| | Start | 3 Weeks | 6 Weeks |
| Untreated Raw Water | 157 | 1,050 | 72 |
| Untreated Diatomaceous Earth Filtered Water | 18 | 550 | 128 |
| Treated Water After Filtering Through Aloxite | 0 | 0 | 1 |
| Treated Water at Well #40 | 0 | 0 | 10 |

The results of the corrosion tests on a basis of weight loss of test coupons show the following:

|  | Percent Relative Corrosivity of the Water |
|---|---|
| Raw water | 100 |
| Diatomaceous Earth Filtered and Treated Water | 55 |
| Treated Water After Pressuring and Aloxite Filtering | 62 |

Additional field tests were run on a larger lease in the Bradford fields. As in the preceding tests, bacteria counts were made at the start, after three weeks, and at the end of six weeks. Also, corrosion inhibitor tests were made by inserting test metal coupons at three locations in the pipe system, and weighed before and after the test to determine percent protection afforded by the treating of the water with the dicoco dimethyl ammonium chloride in concentrations of 10 p. p. m. The bacteria counts were made by plating out on agar and incubating at 37.5° C. for twenty-four and forty-eight hours. The results of these tests are reported to be low:

| Source of Water Sample | Bacteria Counts per Ml | | | | | |
|---|---|---|---|---|---|---|
|  | Start | | 3 Weeks | | 6 Weeks | |
|  | 24 hrs. | 48 hrs. | 24 hrs. | 48 hrs. | 24 hrs. | 48 hrs. |
| Raw Water | 1 | 2 | 0 | 0 | 0 | 3 |
| Treated Water After Pump | 0 | 0 | 0 | 0 | 0 | 1 |
| Backflow Water Well #030 | 2 | 397 | 1 | 1 | 0 | 0 |

| Test Location | Average Percent Wt. Loss of Corrosion Test Coupons | |
|---|---|---|
|  | Scrubbed | Acid Cleaned |
|  | Percent | Percent |
| Raw Water at Plant | 0.77 | 1.01 |
| Treated Water After Pump | 0.31 | 0.36 |
| (Percent Protection) | (77.9) | (85.4) |
| Line Water Ht. Well #030 | 0.12 | 0.19 |
| (Percent Protection) | (84.4) | (81.2) |

While in the foregoing specification we have set forth specific details for purpose of illustrating our invention, it will be apparent to those skilled in the art that many of these details can be varied widely without departing from the spirit of our invention.

We claim:

1. In the method of secondary oil recovery characterized by the step of injecting flooding water under pressure through subterranean pipes into oil-bearing reservoir rock formations to displace portions of the residual oil therein toward a producing well, the improvement comprising having present in said injected flooding water a minute proportion of dicoco dimethyl ammonium chloride to inhibit the growth of bacteria within said formations, to prevent both acid and alkaline corrosion of said pipes, and to decrease the interfacial tension between the oil and water.

2. In the method of secondary oil recovery characterized by the step of injecting flooding water under pressure through subterranean pipes into oil-bearing reservoir rock formations to displace portions of the residual oil therein toward a producing well, the improvement comprising having present in said injected flooding water at least 2 parts per million of dicoco dimethyl ammonium chloride to inhibit the growth of bacteria within said formations to prevent both acid and alkaline corrosion of said pipes, and to decrease the interfacial tension between the oil and water.

3. In the method of secondary oil recovery characterized by the step of injecting flooding water under pressure through subterranean pipes into oil-bearing reservoir rock formations to displace portions of the residual oil therein toward a producing well, the improvement comprising having present in said injected flooding water between about 2 to 100 parts per million of dicoco dimethyl ammonium chloride to inhibit the growth of bacteria within said formations to prevent both acid and alkaline corrosion of said pipes, and to decrease the interfacial tension between the oil and water.

4. In the method of secondary oil recovery characterized by the step of injecting flooding water under pressure through subterranean pipes into oil-bearing reservoir rock formations to displace portions of the residual oil therein toward a producing well, the improvement comprising having present in said injected flooding water about 5 to 10 parts per million of dicoco dimethyl ammonium chloride to inhibit the growth of bacteria within said formations to prevent both acid and alkaline corrosion of said pipes, and to decrease the interfacial tension between the oil and water.

5. In the method of secondary oil recovery, the step of injecting flooding water containing dissolved oxygen into oil-bearing reservoir rock formations under pressure through subterranean pipes to displace portions of the oil therein toward a producing well, said water having present therein at least 2 parts per million of dicoco dimethyl ammonium chloride and at least 25 parts per million of sodium nitrite.

6. In the method of secondary oil recovery, the step of injecting flooding water containing dissolved oxygen into oil-bearing reservoir rock formations under pressure through subterranean pipes to displace portions of the oil therein toward a producing well, said water having present therein about 5 to 10 parts per million of dicoco dimethyl ammonium chloride and about 50 parts per million of sodium nitrite 7. In the method of secondary oil recovery characterized by the step of injecting flooding brine waters obtained from producing oil wells into oil-bearing reservoir rock formations through subterranean pipes to displace portions of the residual oil therein toward a producing well, the improvement comprising having present in said injected brine waters about 5 to 10 parts per million of dicoco dimethyl ammonium chloride References Cited in the file of this patent

UNITED STATES PATENTS

| 2,053,024 | Dreyfus | Sept. 1, 1936 |
| 2,254,940 | Endres | Sept. 2, 1941 |
| 2,295,504 | Shelton | Sept. 8, 1942 |
| 2,302,697 | Katzman | Nov. 24, 1942 |
| 2,317,999 | Leuchs | May 4, 1943 |
| 2,331,594 | Blair | Oct. 12, 1943 |
| 2,341,500 | Detling | Feb. 8, 1944 |
| 2,414,668 | Ratcliffe | Jan. 21, 1947 |
| 2,462,970 | Holtzclaw | Mar. 1, 1949 |

OTHER REFERENCES

Plummer et al. Water Cones and Water Sheaths in Experimental Oil Wells, article in the Bulletin of the American Association of Petroleum Geologists vol. 24, No. 12, December 1940, pp. 2163–2179.